United States Patent [19]
Crowson et al.

[11] 3,986,982
[45] Oct. 19, 1976

[54] CHLORINE REGENERATION OF PLATINUM GROUP METAL ZEOLITE CATALYSTS

[75] Inventors: Roger Crowson, Richmond; John David Hargrove, Aldershot; Christopher Ronald Pout, Feltham, all of England

[73] Assignee: The British Petroleum Company Limited, London, England

[22] Filed: June 3, 1974

[21] Appl. No.: 475,502

[30] Foreign Application Priority Data
June 21, 1973 United Kingdom............... 29473/73

[52] U.S. Cl................................ 252/415; 208/111; 252/416; 252/419
[51] Int. Cl.$^2$..................... B01J 29/38; C10G 13/10
[58] Field of Search................... 252/415, 419, 416; 208/111, 140, 18, 27

[56] References Cited
UNITED STATES PATENTS

| | | | |
|---|---|---|---|
| 2,939,897 | 6/1960 | Beber et al. | 252/416 |
| 2,965,563 | 12/1960 | Steffegen et al. | 208/140 |
| 3,134,732 | 5/1964 | Kearby et al. | 252/415 |
| 3,197,399 | 7/1965 | Wight et al. | 208/111 |
| 3,247,128 | 4/1966 | White et al. | 252/415 |
| 3,692,692 | 9/1972 | Ward et al. | 252/419 |
| 3,699,056 | 10/1972 | Takase et al. | 252/455.2 |
| 3,749,754 | 7/1973 | Eberly, Jr. | 260/683.68 |
| 3,835,026 | 9/1974 | Takase et al. | 208/111 |
| 3,875,049 | 4/1975 | Klvksdahl | 252/415 |

FOREIGN PATENTS OR APPLICATIONS

| | | | |
|---|---|---|---|
| 1,168,431 | 10/1969 | United Kingdom | 252/416 |

*Primary Examiner*—Winston A. Douglas
*Assistant Examiner*—P. E. Konopka
*Attorney, Agent, or Firm*—Morgan, Finnegan, Pine, Foley & Lee

[57] ABSTRACT

The regeneration of a Pt group metal-acid-resistant, alkali-metal deficient zeolite catalyst comprises (a) a burn off at 500° C max (b) a treatment with inert gas, 0.5–20% vol $O_2$ and 5–500 ppm vol Cl at 400°–550° C (c) a purge and (d) a reduction in a stream of $H_2$ at 200°–600° C.

The treatment with inert gas, $O_2$ Cl is believed to redistribute the Pt group metal and restore catalyst activity in a way that burn-off alone cannot do.

The Cl may be added as Cl, Cl,HCl or an organic chlorine-containing material. The catalysts may have a $SiO_2 - Al_2O_3$ molar ratio of at least 5:1 to ensure acid resistance and the preferred catalyst is Pt-H-mordenite which has been used for the selective cracking of n-paraffins in petroleum fractions.

10 Claims, No Drawings

CHLORINE REGENERATION OF PLATINUM GROUP METAL ZEOLITE CATALYSTS

This invention relates to the regeneration of alkali-metal deficient zeolite catalysts containing a platinum group metal, particularly the regeneration of such catalysts which have been used in a hydrocatalytic process for the selective cracking of n-paraffin hydrocarbons.

The regeneration of zeolite catalysts by oxidative burn-off is generally known but, in practice, difficulties have been experienced. For example with catalysts of a platinum group metal on an alkali metal deficient mordenite initial activity can be restored by regeneration but this restored initial activity is not always maintained over long periods of further operation. This failure to restore sustained activity appears to be related to the regeneration itself rather than to non-reversible loss of activity during processing, because a relatively fresh, active catalyst can itself lose activity as a result of regeneration.

The present invention is based on the belief that loss of activity is due to migration of the platinum group metal during regeneration and proposes an after-treatment to redistribute the platinum group metal.

According to the present invention, therefore, a process for the regeneration of a catalyst comprising a platinum group metal hydrogenating component and an acid-resistant alkali-metal deficient zeolite which has become deactivated during the hydrocatalytic treatment of hydrocarbons comprises the steps of a. burning off deposits on the catalyst with a stream of inert gas and oxygen at a temperature controlled to a maximum of 550° C.

b. treating the catalyst at 400° – 550° C, with a stream of an inert gas, from 0.5 to 20% volume of free oxygen and from 5 to 500 ppm vol of chlorine as chlorine, HCl or an organic chlorine-containing material, c. purging the catalyst to remove residual oxygen and chlorine d. reducing the catalyst in a stream of hydrogen at 200° – 600° C.

Describing the regeneration sequence in more detail, when the catalyst has become deactivated during a processing step, the step is terminated by stopping the flow of feedstock. The passage of hydrogen may be continued so that hydrocarbons are purged. The temperature at this stage may be from ambient to 450° C and the pressure from atmospheric to the operating pressure of the process.

After the hydrogen treatment a conventional purge with an inert gas may be given to remove the hydrogen, prior to the introduction of the oxygen containing gas. Suitable purge conditions may be temperatures of 100° to 300° C and pressures of 5 to 20 bars, using a stream of nitrogen.

the aim of the oxidative burn-off is to remove carbonaceous deposits and any ammonium or sulphur compounds, without destroying the zeolite crystal structure and with agglomeration or migration of the platinum group metal kept to a minimum. The burn-off may be initiated at 100° C or above by introducing a small amount of oxygen, preferably as air, into the inert purge gas. The amount of oxygen is controlled in known manner to give a maximum temperature below 550° C. Preferably the initial temperature is kept below 400° C, with the temperature being raised to 400° – 500° C, preferably incrementally to the maximum permitted, when it is seen that no more carbon oxides are evolved at the lower temperature. The oxygen content may be from 0.1 to 20% volume, with lower amounts e.g. 0.1 to 10.0% volume being used in the initial stages and larger amounts e.g. 2 to 20% volume being used in the later stages.

An important aspect of the controlled burning is control of the water produced from the hydrogen present in the deposits, or added adventitiously. Low temperatures and oxygen contents control the water in the early stages; in the later stages there is little hydrogen left on the catalyst so higher temperatures and oxygen contents are permissible. Steam is obviously an unsuitable regeneration gas. Nitrogen is the preferred inert gas.

Preferably the inert gas is recycled and is dried to remove the water produced and prevent its build up in the system. Preferably the water content of the gas at the inlet is below 200 ppm volume. Any nitrogen or sulphur compounds e.g. $NH_3$ or $H_2S$ which may be present in recycled gas are also desirably removed. Molecular sieves may conveniently be used to dry the gas and these will also adsorb any $NH_3$ and $H_2S$.

The platinum group metal-zeolite catalysts which may be regenerated by the present invention are not permanently poisoned by nitrogen and sulphur compounds during a hydrocatalytic treatment, provided the compounds are too large to enter the zeolite pores. Smaller compounds such as $NH_3$ and $H_2S$, which may be produced in the reaction zone, are detrimental in large amounts and it is normal practice, therefore, to remove such compounds from the recycle gas during the hydrocatalytic treatment. As a result the amounts of nitrogen and sulphur compounds on a catalyst to be regenerated are likely to be small and no special precautions are necessary during the regeneration, apart from the previously stated removal of $NH_3$ and $H_2S$ from the regeneration recycle gases.

Another important aspect of the regeneration is, as previously stated, the use of higher temperatures of from 400° – 550° C in the later stages, it having been found that residual carbon is not easily removed from zeolite catalysts. The high temperature stage may also serve as a preliminary to the subsequent platinum redistribution step.

Pressures throughout the burn-off may be from 1 to 70 atmospheres with a preference for moderate pressures of from 2 to 25 atmospheres. The total time will depend on the amount of deposits but may conveniently be from 20 to 200 hours, with from 10 to 100 hours at the higher temperature of 400° – 550° C.

The step which is believed to redistribute the platinum group metal follows. The need to redistribute platinum group metals in e.g. platinum-alumina gasoline reforming catalysts is known but special considerations apply with zeolite catalysts. The platinum group metals are normally added by ion-exchange to active sites largely within the pores of the zeolite crystals. This internal location is particularly important with zeolite catalysts to be used in selective conversion process. Although the ion-exchange platinum group metals may be reduced before the catalyst is used, this internal location is still crucial for two reasons.

Firstly, it is considered important that the platinum group metal should be closely associated with active electron-deficient sites of the zeolite itself and these active sites are located within the zeolite pores. Secondly, the presence of substantial amounts of platinum group metal on the external surface of a zeolite may tend to reduce the selectivity of the catalyst by encouraging the conversion of hydrocarbons unable to enter the zeolite pores. It would appear that platinum group metals in zeolite catalysts migrate and/or revert to an inactive form more readily than platinum group metals in reforming catalysts, so that the metal redistribution step is required after each regeneration.

In platinum-alumina reforming catalysts, the metal is located as small crystallites on the surface of the alumina, and the object of a platinum redistribution step is to break-up large aggregations of metal which tend to form with extended use. Large aggregations of metal cannot form within the pores of a zeolite, so it is metal migration or another form of deactivation which is the cause of loss of activity in zeolite catalysts.

Another difference from the known metal redistribution treatment of reforming catalysts is that metal redistribution in such catalysts is normally carried out in the presence of water vapour. Zeolites tend to be decomposed by extended contact with water vapour at high temperature and a particularly preferred feature of the present metal redistribution step is that the inlet gases have a water content of below 200 ppm volume. It has been found that with zeolite catalysts metal redistribution is possible using only oxygen and chlorine, without substantial amounts of water vapour. Since any hydrocarbons on the catalyst will have been removed by the regeneration, water is not likely to be formed in situ during the metal redistribution step and it is only necessary to ensure that the inlet gases are dry. Similarly no problems are likely from the presence of nitrogen and sulphur compounds.

The preferred temperature for the metal redistribution step is 490° – 530° C. The oxygen content of the gas is not critical and may conveniently be from 2 – 10% volume. After any necessary adjustment of temperature and oxygen content the redistribution step may be initiated by adding chlorine to the gas. The concentration of chlorine in the gas is preferably from 20 to 300 ppm vol. and the total amount of chlorine by weight of catalyst treated may be from 0.1 to 5% wt., preferably from 0.2 to 2% wt.

As indicated above the chlorine can be added as chlorine gas, hydrogen chloride, or, preferably an organic chlorine containing compound, particularly a chlorinated derivative of a $C_1 - C_4$ hydrocarbon. Examples of suitable compounds are carbon tetrachloride and propylene dichloride, preference being given for compounds which are liquid at ambient temperature and the pressure of operation, since controlled injection of the chlorine into the gas is thereby facilitated.

Pressures may be as for the burn-off and the time may be from 1 to 16 hours.

Following the treatment with chlorine there may be a "smoothing" step, when the injection of chlorine is stopped but operation continued at the same oxygen concentration and the same or reduced temperature. This step serves to remove any excess chlorine, and may conveniently last from 1 to 10 hours.

Flow rates of the gases used in all the steps of the process should be such as to ensure rapid removal of products including any potentially damaging water vapour. Preferably the gas mass velocity is at least 500 kg/m² of catalyst bed cross section/hr.

Before the reduction step the system is purged with nitrogen to remove residual oxygen and chlorine and the temperature is adjusted as necessary. This purging can be carried out simply by stopping the flow of oxygen and chlorine and may be continued until monitoring of the effluent shows no further removal of oxygen and chlorine. The reduction is preferably carried out in a stream of hydrogen flowing at 200 to 6,000 volumes of gas/volume of catalyst/hour at a final temperature of 350° – 550° C and a pressure of 0 to 35 bars gauge. The time may be from 10 to 100 hours.

The amount of platinum group metal on the catalyst may be from 0.01 to 10% wt., preferably 0.1 to 5% wt. The platinum group metals are platinum, palladium, rhodium, ruthenium, osmium and iridium, the first two being preferred.

Since the zeolite is contacted with chlorine it has to be acid resistant and is preferably therefore one with a $SiO_2:Al_2O_3$ molar ratio of at least 5:1 e.g. mordenite, erionite, offretite, Zeolite T, Zeolite L and the Zeolite Y variant of faujasite. Some chlorine may be retained on the catalyst but this has not been found to be deleterious.

As indicated above, to show significant catalytic activity the zeolite has to be alkali-metal deficient. Zeolites consist of an anionic lattice of silicon, aluminium and oxygen atoms with more loosely held cations providing the ionic balance. As normally prepared the cation is a monovalent alkali metal for example sodium or potassium. However these monovalent cations can be replaced by polyvalent cations or by hydrogen giving an alkali metal deficient or acidic zeolite. Polyvalent cations can be added to the zeolite in known manner by contact with a solution of an appropriate metal salt. Hydrogen zeolites can be produced in known manner either by direct acid treatment in the case of acid-resistant zeolites or by contact with a solution of an ammonium salt followed by heating at 200° – 500° C to drive off the ammonia. Zeolites containing both polyvalent metal cations and hydrogen may be obtained, by appropriate simultaneous or sequential treatment but preferably by first forming the ammonium or hydrogen zeolite, then adding the polyvalent metal cations, and heating as necessary. Preferably the zeolite has an alkali-metal content of below 5% wt and more particularly below 2% wt.

The particular zeolite and the particular metal will depend on the hydrocatalytic process for which the catalyst is to be used. As indicated above, the regeneration technique is particularly suitable for use with the hydrocatalytic processes using as feedstock a mixture of hydrocarbons, one of which is selectively converted. For example the catalyst may be a catalyst of a platinum group metal on an alkali-metal deficient mordenite which has been used for the selective cracking of n-paraffins in hydrocarbon fractions, particularly waxy n-paraffin hydrocarbons, as described and claimed in UK Patent Nos. 1,088,933 and 1,134,014. As described in these patents the catalyst may comprise 0.1 to 5% wt of a platinum group metal, particularly platinum or palladium, on a decationised crystalline mordenite, preferably one decationised by direct acid treatment and having a $SiO_2:Al_2O_3$ ratio of at least 14:1. The catalysts may be used with hydrocarbon feedstocks above $C_4$, particularly $C_4$ and higher petroleum fractions. Preferred feedstocks are those with more than 50% vol. of material boiling above 250° C, particularly distillate fractions boiling in the range 250° – 600° C. The process conditions may be

| | Broad range | Preferred range |
|---|---|---|
| Temperature °C | 232 – 510 | 260 – 454 |
| Pressure bars (gauge) | 17 – 210 | 68 – 170 |
| Space velocity v/v/hr | 0.2 – 20 | 0.4 – 5 |
| Hydrogen gas rate mol/m³ | 7.5 – 225 | 38 – 114 |

The selective cracking of the n-paraffins lowers the pour point of the feedstock and gives as a useful by-product a gas consisting mainly of $C_3$ and $C_4$ paraffins.

Another selective conversion process is one which selectively cracks n-paraffins in gasoline fractions, particularly catalytic reformates, to increase their octane number. The catalysts used may comprise a Group VIII metal, on an alkali-metal deficient zeolite, which may be erionite or offretite.

The invention is illustrated by the following comparative examples.

EXAMPLE 1

The platinum-hydrogen-mordenite had the following analysis when fresh:

| | |
|---|---|
| Platinum % wt | 0.58 |
| Silicon % wt | 34.8 |
| Aluminum % wt | 4.0 |
| Sodium % wt | 0.75 |
| $SiO_2$ : $Al_2O_3$ ratio (molar) | 16.8 |
| Surface area m²/g | 340 |
| Pore volume ml/g | 0.17 |

500 mls of this Pt-H-mordenite were used to dewax a number of waxy distillate feedstocks boiling within the range 350° – 550° C.

Operating conditions were maintained within the following ranges:

| | | |
|---|---|---|
| Pressure | bar (ga) | 105 |
| Catalyst temperature | ° C | 340 – 415 |
| L.H.S.V. | v/v/hr | 0.5 – 2.0 |
| Recycle gas rate | m³/m³ | 850 – 1700 |

After 5698 H.O.S., the feed pump was switched off and hot hydrogen recycle was maintained as follows:

| | |
|---|---|
| Pressure | 105 bar (ga) |
| Catalyst temperature | 400°C |
| Recycle gas rate | 1700 m³/m³ |
| Duration | 4 hours |

The reactor heaters were then switched off and the catalyst bed was allowed to cool back, taking approximately 10 hours to reach 50° C. The reactor was then depressured at a rate of 7 bar/hour whilst maintaining cold hydrogen recycle. Finally, gas recycle was stopped, the reactor was taken down and the catalyst was discharged in three portions corresponding to the top, middle and bottom of the catalyst bed.

Small samples of each portion of the catalyst bed were solvent extracted under reflux (toluene for 16 hours then n-heptane for 6 hours) to remove hydrocarbons; dried at 130° C overnight, and submitted for analysis. The following results were obtained:

Table 1

| | | Spent Catalyst | | |
|---|---|---|---|---|
| | | Top | Middle | Bottom |
| Carbon | % wt | 3.7 | 3.6 | 3.9 |
| Nitrogen | % wt | 0.62 | 0.64 | 0.60 |
| Sulphur | % wt | <0.05 | <0.05 | 0.15 |
| Surface Area | m²/g | 15 | 17 | 15 |
| Pore volume | | 0.02 | 0.02 | 0.02 |

100 mls. of the spent catalyst as discharged (i.e., no solvent extraction) were regenerated as follows:
 a. Catalyst charged to reactor
 b. Unit pressured to 3.4 bar (ga) nitrogen
 c. Recycle gas rate of 950 v/v/hr established. The recycle gas was passed over a molecular sieve to remove water and any $NH_3$ and $H_2S$ produced. The water content was held at 100–130 ppm throughout the regeneration.
 d. Temperature raised to 200° C at 50° C/hour under nitrogen recycle
 e. Exit gas rate of 150 v/v/hr established Make-up gas — 7% vol. $O_2$ in $N_2$
 f. The catalyst temperature was varied as follows:
 Held at 200° C for 8 hours
 200° C to 300° C at 10° C/hr
 Held at 300° C for 60 hours
 300° C to 350° C at 20° C/hr
 Held at 350° C for 1 hour
 350° C to 400° C at 10° C/hour
 400° C to 450° C at 4° C/hr
 450° C to 480° C at 30° C/hr
 Held at 480° C for 2 hours
 480° C to 530° C at 10° C/hr
 Held at 530° C for 24 hours At all stages, the recycle gas $O_2$ content was maintained at 6 – 6.5% vol., by bleeding off 150 v/v/hr of gas at the exit and replacing it with a corresponding amount of make-up gas of 7% vol. $C_2$ in $N_2$. It should be emphasised that the use of a recycle gas of high $O_2$ content with bleed off and replacement was employed as a practical convenience and that the effective amount of $O_2$ used in the burn-off was only 0.5 – 1.0% volume.

Following the burn-off, a platinum redistribution operation (hereinafter referred to as rejuvenation) was carried out as follows:
 a. Temperature reduced to 510° C
 b. Recycle gas rate, exit gas rate, make-up gas rate and pressure maintained as for the regeneration
 c. 7% vol $O_2$ in $N_2$ passed through carbon tetrachloride maintained at 0° C and then over the catalyst for 2 hours
 d. 7% $O_2$ flow stopped — catalyst cooled back to ambient temperature, then discharged.

The carbon tetrachloride picked up by the gas gave a chlorine content for the gas of 150 ppm volume. The total amount of chlorine passed over the catalyst was 1.2% wt/wt of catalyst.

The recycle gas was dried by passing it over a molecular sieve. The water content remained in the range 100–130 ppm throughout the rejuvenation.

Catalyst analyses were:

TABLE 2

| | | Fresh | Spent | Burn off + rejuvenation |
|---|---|---|---|---|
| Carbon | % wt | — | 3.7 | 0.1 |
| Surface area | m²/gm | 340 | 15 | 370 |
| Pore volume | ml/gm | 0.17 | 0.02 | 0.18 |

TABLE 2-continued

|  |  | Fresh | Spent | Burn off + rejuvenation |
|---|---|---|---|---|
| Soluble platinum | % wt | 0.39 | 0.02 | 0.35 |
| Chlorine | % wt | <0.05 | — | 0.43 |
| Mordenite content | % wt | 100+ | — | 100 |

+ Standard

The regenerated catalyst was then subjected to an activity test as follows:
a. 50 mls of catalyst charged to reactor
b. Catalyst reduced in hydrogen as follows:

| Pressure | 14 bar (ga) H₂ |
|---|---|
| Recycle gas rate | 1400 v/v/hr |
| Exit gas rate | 1000 v/v/hr |

The recycle gas was dried with molecular sieve.
The catalyst temperature was varied as follows:
Ambient to 100° C at 25° C/hour
Held at 100° C for 4 hours
100° C to 200° C at 20° C/hour
Held at 200° C for 26 hours
200° C to 250° C at 10° C/hour
Held at 250° C for 16 hours
250° C to 300° C at 10° C/hour
Held at 300° C for 4 hours
300° C to 300° C at 10° C/hour
400° C to 500° C at 25° C/hour
Held at 500° C for 8 hours
Cooled back to 200° C
A 298° – 340° C ASTM boiling range waxy distillate feedstock was then introduced at the following conditions:

| Pressure | 105 bar (ga) |
|---|---|
| Catalyst temperature | 200° C |
| Recycle gas rate | 1700 m³/m³ |
| L.H.S.V. | 1.0 v/v/hr |

N.B. recycle gas scrubbed to remove NH₃, H₂S and H₂O

The catalyst temperature was raised to 300° C at 25° C/hr then to the operating temperature at 6° C/hour.

Table 3 shows results of processing the feedstock over (a) fresh catalyst (b) the catalyst treated according to the present invention and (c) a catalyst regenerated by burn-off alone.

TABLE 3

| Catalyst type |  |  | Fresh | Burn off and rejuvenation | Burn off alone |
|---|---|---|---|---|---|
| Catalyst Charge | mls |  | 500 | 50 | 50 |
| Hours on stream |  |  | 501–549 | 873–921 | 116–180 |
| Operating conditions |  |  |  |  |  |
| Pressure | bar (ga) |  | 105 | 105 | 105 |
| Catalyst temperature | ° C |  | 390 | 390 | 400 |
| L.H.S.V. | v/v/hr |  | 1.0 | 1.0 | 1.0 |
| Recycle gas rate | m³/m³ |  | 850 | 1700 | 1700 |
| Stabilised product data |  | Feed |  |  |  |
| Pour Point | ° C | −9 | −36 | −45 | −18 |
| Kinematic viscosity at 100° F | cSt | 8.81 | 9.05 | 9.58 | — |
| Kinematic viscosity at 210° F | cSt | 2.20 | 2.22 | 2.27 | — |
| Viscosity index |  | 45 | 35 | 32 | — |

Table 3 shows that the catalyst activity was fully restored by a burn-off and rejuvenation, but not by a burn off alone.

EXAMPLE 2

A fresh platinum-hydrogen mordenite catalyst had the following anaysis:

| Pt | % wt | 0.57 |
|---|---|---|
| Si | % wt | 38.4 |
| Al | % wt | 4.2 |
| Na | % wt | 0.61 |
| SiO₂:Al₂O₃ (molar ratio) |  | 17.6 |
| Surface area | m²/g | 420 |
| Pore volume | ml/g | 0.19 |
| Chloride | % wt | <0.05 |

500 mls of this catalyst was used to process waxy distillate feedstocks boiling in the range 350° – 550° C for a total of 892 hours. Operating conditions were maintained within the following ranges:

| Pressure | bar (ga) | 70 – 105 |
|---|---|---|
| Catalyst temperature | ° C | 360 – 410 |
| L.H.S.V. | v/v/hr | 1.0 |
| Recycle gas rate | Nm³/m³ | 850 – 1700 |

The unit was shut down as in example 1.
A sample of the catalyst was solvent extracted under reflux (toluene for 16 hrs then n-heptane for 6 hours), dried at 130° C overnight and analysed with the following results.

| Carbon | 4.9 | % wt |
|---|---|---|
| Nitrogen | 0.56 | % wt |
| Sulphur | <0.05 | % wt |
| Surface area | 15 |  |
| Pore volume | 0.02 |  |

As compared with fresh catalyst it will be seen that the used catalyst contained appreciable amounts of carbon and nitrogen and had a low surface area.

Separate 100 ml portions of catalyst as discharged (i.e., not solvent extracted) were subjected to burn off and burn off/rejuvenation as follows:

a. Burn-Off alone i. Catalyst charged to reactor.
ii. Unit pressured to 17 bar (ga) nitrogen.
iii. Recycle gas rate of 1750 v/v/hr established. The recycle gas was passed over a molecular sieve to remove water and any NH₃ and H₂S produced. The water content was held at 100–130 ppm.
iv. Temperature raised to 200° C at 25° C/hour then from 200° C to 300° C at 10° C/hour.

v. Exit gas rate of 600 v/v/hr established.

Make-up gases — nitrogen and air of variable $O_2$ content as shown below.

vi. 2% $O_2$ established at the reactor inlet. The temperature was varied as follows:

Held at 300° C for 16 hours
300° – 350° C at 10° C/hour
Held at 350° C for 2 hours
350° to 400° C at 10° C/hour
Held at 400° C for 2 hours
400° C – 450° C at 10° C/hour
Held at 450° C for 4 hours.

vii. $O_2$ content increased to 5% vol.
Temperature held at 450° C for 4 hours.

viii. Catalyst then maintained under 100% $N_2$ recycle at 450° C for 18 hours.

ix. Catalyst temperature reduced to ambient.

The catalyst was then reduced in hydrogen using the procedure described in Example 1 and subjected to a dewaxing activity test.

b. Burn-off/rejuvenation i. Catalyst charged to reactor.
ii. Unit pressured to 3.4 bar (ga) nitrogen.
iii. Recycle gas rate of 650 v/v/hr established. The recycle gas was passed over a molecular sieve to remove water and any $NH_3$ and $H_2S$ produced. The water content remained at 100–130 ppm throughout both the regeneration and the rejuvenation.

iv. Temperature raised to 200° C at 50° C/hour under $N_2$ recycle.

v. Exit gas rate of 150 v/v/hr established.
Make-up gas 7% vol. $O_2$ in $N_2$ vi. The catalyst temperature was varied as follows:
Held at 200° C for 13 hours.
Temperature raised to 250° C at 25° C/hr
Held at 250° C for 21 hours
250° C to 300° C at 25° C/hr
Held at 300° C for 10 hours
300° C to 250° C at 25° C/hr
Held at 350° C for 8 hours
350° C to 400° C at 25° C/hr
Held at 400° C for 4 hours
400° C to 45° C at 25° C/hr
Held at 450° C for 4 hours
450° C to 510° C at 20° C/hr
Held at 510° C for 8 hours At all stages, the recycle gas $O_2$ content was maintained at 6 – 6.5% by bleeding off 150 v/v/hr of gas at the exit and replacing it with a corresponding amount of make-up gas of 7% vol. $O_2$ in $N_2$.

Following the burn-off, a platinum redispersal operation was carried out as follows:

i. temperature maintained at 510° C ii. recycle gas rate, exit gas rate, make-up gas rate and pressure maintained as for regeneration.

iii. 7% vol. $O_2$ in $N_2$ passed through carbon tetrachloride and then over the catalyst for 2 hours.

iv. 7% $O_2$ flow stopped — catalyst cooled back to ambient temperature then discharged.

The carbon tetrachloride picked up by the gas gave a chlorine content for the gas of 150 ppm volume. The total amount of chlorine passed over the catalyst was 1.2% wt/wt. of catalyst.

The catalyst was then subjected to an activity test as follows:

i. catalyst charged to reactor.
ii. catalyst reduced in $H_2$ as in Example 1.
iii. dewaxing activity test carried out.

A waxy distillate having an ASTM boiling range of 368° – 490° C was processed under the following conditions:

| Pressure | bar (ga) | 105 |
| L.H.S.V. | v/v/hr | 1.0 |
| Recycle gas rate | $m^3/m^3$ | 1700 |

The following results were obtained:

Table 4

| Catalyst | | Fresh | Burn-off alone | Burn-off + Rejuvenation |
|---|---|---|---|---|
| Catalyst temperature (° C) | | 380 | 400 | 380 |
| Stripped Product Data: | Feed | | | |
| Yield | % wt. | — | 84.2 | 86.1 | 83.5 |
| Pour Point | ° C | + 33 | – 18 | – 3 | – 18 |
| K.V. at 100° F | cSt | 47.7 | 74.7 | 65.0 | 75.8 |
| K.V. at 210° F | cSt | 6.36 | 7.32 | 6.96 | 7.39 |
| Viscosity Index | | 88 | 48 | 57 | 48 |

Table 4 shows that catalyst activity was only partially restored by a burn-off alone, but that burn-off + rejuvenation gave an activity equivalent to that of the fresh catalyst.

We claim:

1. A process for the regeneration of a catalyst consisting essentially of an acid-resistant alkali-metal deficient mordenite containing a platinum group metal hydrogenating component within its pores, which has become deactivated during the selective hydrocracking of n-paraffins in a waxy hydrocarbon feedstock, comprising the steps of a. burning off carbonaceous deposits on the catalyst with a stream of inert gas and oxygen at a temperature controlled to a maximum of 550° C, the water content of the gas at the inlet being below 200 ppm volume, b. treating the catalyst at 400° – 550° C, with a stream of inlet gases comprising an inert gas, from 0.5 to 20% volume of free oxygen and from 5 to 500 ppm vol. of chlorine, the water content of the inlet gases having an inlet water content of below 200 ppm volume, until the catalyst has been treated with 0.1 to 5% by weight of chlorine based on the weight of the catalyst, the chlorine for reaction being provided by a chlorine-containing material selected from the group consisting of chlorine gas, HCl and a chlorinated derivative of a $C_1$-$C_4$ hydrocarbon, c. purging the catalyst to remove residual oxygen and chlorine, d. reducing the catalyst in a stream of hydrogen at 200° – 600° C and wherein in steps (a), (b), (c), and (d) the gas streams flow at a gas mass velocity of at least 500 Kg/m$^2$ of catalyst bed cross section/hr.

2. A process as claimed in claim 1 wherein the burn-off temperature in step (a) is kept below 400° C. using a gas containing 0.1 to 10.0% volume of oxygen, the temperature being subsequently raised to 400° – 550° C. using a gas containing 2 – 20% volume of oxygen.

3. A process as claimed in claim 1 wherein the burn-off pressure is from 1 to 70 atmospheres and the time from 20 to 200 hours.

4. A process as claimed in claim 1 wherein the treatment with inert gas, oxygen and chlorine is carried out at 490° – 530° C.

5. A process as claimed in claim 1 wherein the treatment with inert gas, oxygen and chlorine uses a gas with 2 – 10% volume of oxygen and 20 – 300 ppm volume of chlorine.

6. A process as claimed in claim 1 wherein, in the treatment with inert gas, oxygen and chlorine, the chlorine is added as a chlorinated derivative of a $C_1$-$C_4$ hydrocarbon.

7. A process as claimed in claim 1 wherein the treatment with inert gas, oxygen and chlorine is carried out at 1 to 70 atmospheres for 1 to 16 hours.

8. A process as claimed in claim 1 wherein, following the treatment with inert gas, oxygen and chlorine, the injection of chlorine is stopped and operation is continued at the same oxygen concentration and the same temperature for about 1 to about 10 hours.

9. A process as claimed in claim 1 wherein, following the treatment with inert gas, oxygen and chlorine, the injection of chlorine is stopped and operation is continued at the same oxygen concentration and reduced temperature for about 1 to about 10 hours.

10. A process as claimed in claim 1 wherein the reduction is carried out at 350° – 550° C. in a stream of hydrogen flowing at 200 to 6,000 v/v/hr.

* * * * *